United States Patent
Landgraf

(10) Patent No.: US 10,166,830 B2
(45) Date of Patent: Jan. 1, 2019

(54) GAS SPRING SYSTEM FOR A MOTOR VEHICLE, MOTOR VEHICLE WITH SUCH A GAS SPRING SYSTEM, AND METHOD FOR OPERATING A MOTOR VEHICLE

(71) Applicant: Audi AG, Ingolstadt (DE)

(72) Inventor: Johannes Landgraf, Gaimersheim (DE)

(73) Assignee: Audi AG, Ingolstadt (DE)

( * ) Notice: Subject to any disclaimer, the term of this patent is extended or adjusted under 35 U.S.C. 154(b) by 58 days.

(21) Appl. No.: 15/370,640

(22) Filed: Dec. 6, 2016

(65) Prior Publication Data

US 2017/0166026 A1 Jun. 15, 2017

(30) Foreign Application Priority Data

Dec. 9, 2015 (DE) .................. 10 2015 015 921

(51) Int. Cl.
| | |
|---|---|
| *H01M 8/04* | (2016.01) |
| *B60G 11/27* | (2006.01) |
| *B60L 11/18* | (2006.01) |
| *H01M 8/04082* | (2016.01) |
| *H01M 8/04746* | (2016.01) |
| *B60G 17/0195* | (2006.01) |

(52) U.S. Cl.
CPC .......... *B60G 11/27* (2013.01); *B60G 17/0195* (2013.01); *B60L 11/1898* (2013.01); *H01M 8/04201* (2013.01); *H01M 8/04753* (2013.01); *B60G 2202/152* (2013.01); *B60G 2300/50* (2013.01); *B60G 2500/201* (2013.01); *B60Y 2304/01* (2013.01); *H01M 2250/20* (2013.01); *Y02T 90/32* (2013.01)

(58) Field of Classification Search
CPC ................................ B60G 11/27; H01M 8/04
USPC ................... 180/65.31; 429/22–26, 410–415
See application file for complete search history.

(56) References Cited

U.S. PATENT DOCUMENTS

| | | | |
|---|---|---|---|
| 3,099,461 A | 7/1963 | Stelzer | |
| 4,534,977 A | 8/1985 | Strong | |
| 4,535,977 A | 8/1985 | Strong | |
| 9,522,371 B2 * | 12/2016 | Marsh | ........................ B01J 7/00 |
| 2004/0081869 A1 * | 4/2004 | Morishima | ....... H01M 8/04007 |
| | | | 429/415 |

(Continued)

FOREIGN PATENT DOCUMENTS

| | | |
|---|---|---|
| DE | 1086953 B | 8/1960 |
| DE | 1125784 B | 3/1962 |
| DE | 1286414 B | 11/1966 |
| DE | 19724015 A1 | 10/1998 |
| DE | 102007043313 A1 | 3/2009 |

OTHER PUBLICATIONS

English-language abstract of German Patent Application Publication No. 197 24 015, published Dec. 10, 1998; 2 pages.

(Continued)

*Primary Examiner* — Christopher P Schwartz
(74) *Attorney, Agent, or Firm* — Sterne, Kessler, Goldstein & Fox P.L.L.C.

(57) ABSTRACT

The invention relates to a gas spring system for a motor vehicle, with a gas pressure generation unit that can be connected via fluid connections to at least one gas pressure receiver. It is provided therein that the gas pressure generation unit is designed to be operated by gas pressure and configured to be operated by an energy gas pressure of an energy gas for a motor vehicle drive.

17 Claims, 2 Drawing Sheets

(56) References Cited

U.S. PATENT DOCUMENTS

Figure 1:
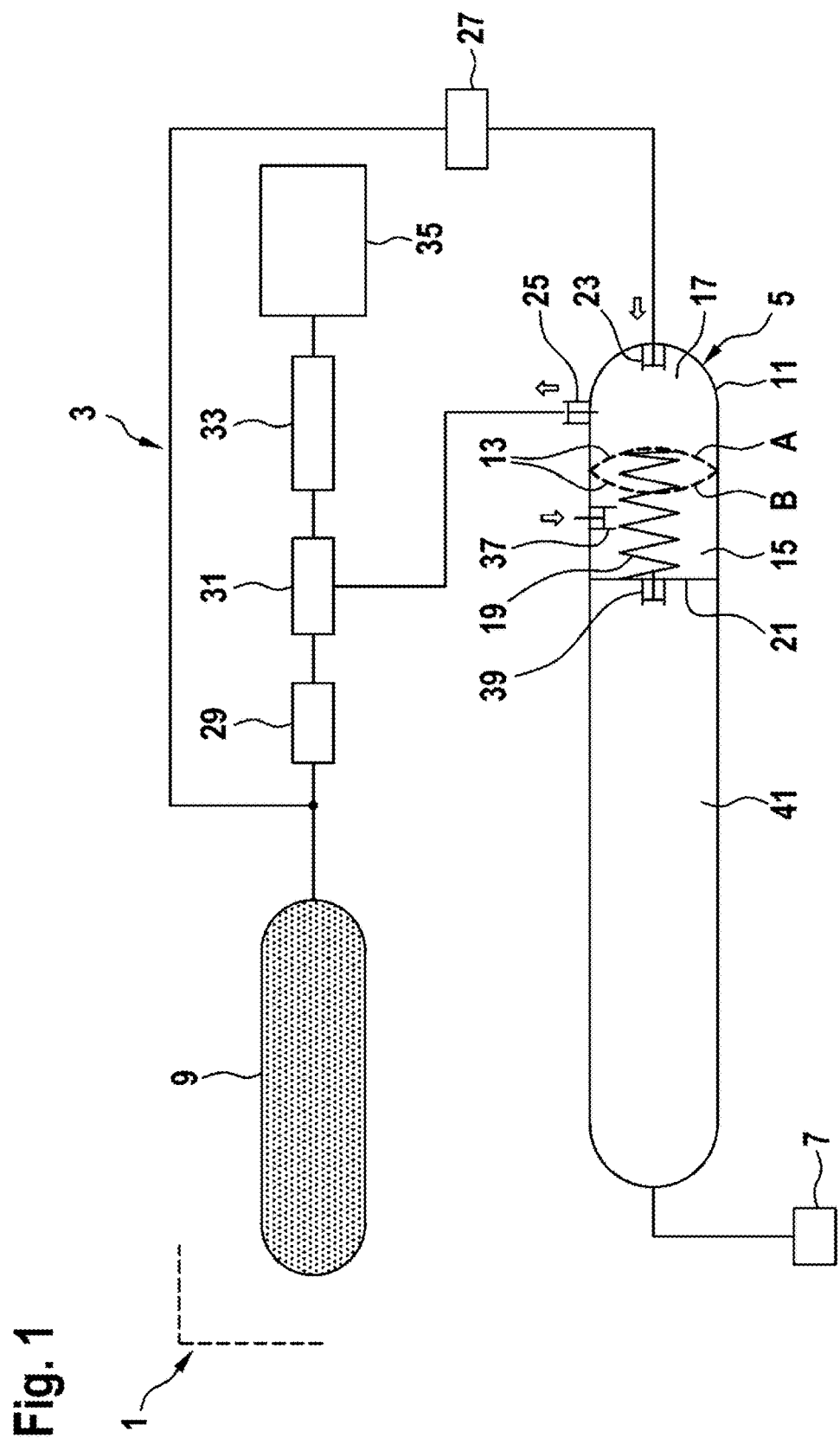

| | | | |
|---|---|---|---|
| 2005/0147863 A1* | 7/2005 | Hiramatsu | H01M 8/04097 |
| | | | 429/413 |
| 2005/0158595 A1* | 7/2005 | Marsh | B01J 7/02 |
| | | | 48/61 |
| 2006/0110640 A1* | 5/2006 | Yoshida | H01M 8/04097 |
| | | | 429/429 |
| 2006/0121326 A1* | 6/2006 | Hiramatsu | H01M 8/04231 |
| | | | 429/410 |
| 2010/0323263 A1* | 12/2010 | Katano | H01M 8/04089 |
| | | | 429/444 |
| 2012/0080253 A1* | 4/2012 | Katano | B60K 1/00 |
| | | | 180/68.1 |
| 2015/0075885 A1* | 3/2015 | Takasu | H01M 8/04597 |
| | | | 180/65.31 |

OTHER PUBLICATIONS

English-language abstract of German Patent Application Publication No. 10 2007 043 313 A1, published Mar. 19, 2009; 1 page.

English-language translation of col. 1, lines 1-12 of German Patent Application Publication No. 1 286 414, published Nov. 15, 1966; 1 page.

English-language translation of col. 1, lines 28-41 of German Patent Application Publication No. 1 086 953, published Aug. 11, 1960; 1 page.

* cited by examiner

GAS SPRING SYSTEM FOR A MOTOR VEHICLE, MOTOR VEHICLE WITH SUCH A GAS SPRING SYSTEM, AND METHOD FOR OPERATING A MOTOR VEHICLE

TECHNICAL FIELD

The invention relates to a gas spring system for a motor vehicle, a motor vehicle with such a gas spring system, and a method for operating a motor vehicle.

BACKGROUND

In particular, motor vehicles of the medium and luxury class are usually equipped with a gas spring system, in particular an air spring system. In this case, in particular compressed air is provided at spring legs of the motor vehicle as gas pressure receivers, wherein the compressed air is generated by an air spring compressor with control unit and valve block. Furthermore, a compressed air reservoir is usually provided. The air spring compressor, the valve block, and the control unit require a relatively large installation space, even if they are provided as an assembly. Moreover, the air spring compressor is loud and therefore imposes high requirements for an acoustic decoupling.

SUMMARY

The invention is based on the task of creating an improved gas spring system for a motor vehicle, an improved motor vehicle, and an improved method for operating a motor vehicle.

The task is solved by creating the objects of the independent claims. Advantageous embodiments result from the subclaims.

The task is in particular solved by creating a gas spring system for a motor vehicle, which comprises a gas pressure generation unit that can be connected via fluid connections to at least one gas pressure receiver. It is provided herein that the gas pressure generation unit is designed to be operated by gas pressure and configured to be operated, in particular driven, by an energy gas pressure of an energy gas for a motor vehicle drive. The gas spring system has advantages compared to the prior art. In particular, since the gas pressure generation unit is operated by gas pressure, an air spring compressor is no longer required so that the installation space required for it is no longer needed. In addition, along with the air spring compressor, an acoustically critical component is dispensed with. The installation space no longer required can be used otherwise. Furthermore, the weight of the motor vehicle is reduced. Since the gas pressure generation unit is operated by the energy gas pressure of the energy gas that is already available for the motor vehicle drive, additional energy is no longer required to operate the gas pressure generation unit. Rather, at most the switching energy of the valves that are possibly used to control the gas pressure generation unit must be supplied.

The term "gas spring system" in particular refers to a system for the suspension and/or damping of a motor vehicle that works with a pressurized operating gas as the suspension and/or damping medium, preferably with compressed air. The gas spring system is preferably designed as an air spring system, wherein air is used as the operating gas for the gas spring system.

The term "gas pressure receiver" in particular refers to a device that is operated with the provided operating gas pressure of the gas spring system, i.e. in particular the compressed air, in particular in order to provide a suspension and/or damping for the motor vehicle. It is possible that the gas pressure receiver is associated with the gas spring system. Alternatively, it is possible that the gas pressure receiver is associated with the motor vehicle and connected to the gas spring system via a fluid connection. The at least one gas pressure receiver is preferably designed as a spring leg.

The term "gas pressure generation unit" in particular refers to a device that is configured to generate an operating gas pressure for the gas spring system. In particular, the gas pressure generation unit is configured to provide compressed air. It is possible that the gas pressure generation unit is designed as a pump.

That the gas pressure generation unit is designed to be operated by gas pressure in particular indicates that the gas pressure generation unit can be operated, in particular driven, by means of a pressurized fuel gas, i.e. with a gas pressure. The energy for generating the operating gas pressure for the gas spring system is thus taken from the pressure energy of a pressurized fuel gas. In this respect, the fuel gas that is used to operate the gas pressure generation unit is preferably different from the operating gas that is pressurized by means of the gas pressure generation unit. Whereas the latter is in particular preferably air, wherein the gas spring system is designed as an air spring system, the gas pressure generation unit is preferably operated with an energy gas as the fuel gas, which is provided for a motor vehicle drive. The energy gas can in particular be a combustion gas.

Accordingly, the term "energy gas" in particular refers to a gas that is suitable for providing energy to a motor vehicle drive. The energy gas is in particular a carrier of chemical energy. Preferably, it is a burnable gas, in particular a combustion gas. It is preferably provided that the energy gas is configured to be converted in a fuel cell.

A development of the invention provides that the gas pressure generation unit is designed as a diaphragm pump. This indicates a design of the gas pressure generation unit that is simple and cost-effective and saves installation space.

A development of the invention provides that the gas pressure generation unit comprises a diaphragm that separates a gas feed chamber from an energy gas chamber. In this case, the gas feed chamber is used to feed and pressurize the operating gas for the gas spring system, with the energy gas chamber being provided to accommodate the energy gas for operating the gas pressure generation unit. Such a design of the gas pressure generation unit is also cost-effective and saves installation space.

The diaphragm is preferably pretensioned in the direction of the energy gas chamber. In this way, it is possible to deflect the diaphragm in the direction of the gas feed chamber by pressurizing with the energy gas pressure in the energy gas chamber and to thus reduce the volume of the gas feed chamber and to in particular feed and/or compress operating gas located in the gas feed chamber. If energy gas pressure is released from the energy gas chamber, the diaphragm can, due to its pretensioning, return in the direction of the energy gas chamber, whereby the volume of the gas feed chamber is increased again. At the same time, the volume of the energy gas chamber is decreased. By increasing the volume of the gas feed chamber, it is possible to suck new operating gas into the gas feed chamber.

It is preferably provided that the diaphragm is pretensioned in the direction of the energy gas chamber by means of a spring element, in particular a coil spring. The spring element is preferably arranged in the gas feed chamber and is supported by one of the chamber walls on the one hand and by the diaphragm on the other hand. Alternatively or additionally, it is possible that the diaphragm itself, in particular due to its material properties and/or its geometrical shape, has elastic properties, as a result of which it is pretensioned in the direction of the energy chamber. Additionally or alternatively, it is possible that a spring element is a structural component of the diaphragm.

A development of the invention provides that the energy gas chamber is associated with a first controllable valve element that is configured to admit energy gas into the energy gas chamber. The energy gas chamber is associated with a second valve element that is configured to discharge energy gas from the energy gas chamber. By means of the controllable valve elements, it is possible in a first switching state to admit energy gas under pressure into the energy gas chamber and to operate the gas pressure generation unit with the pressure energy of the energy gas, in particular to pressurize the diaphragm and to deflect it in the direction of the gas feed chamber. In a second switching state, energy gas and thus pressure can be released from the energy gas chamber. In this state, the diaphragm can in particular return under pretensioning in the direction of the energy gas chamber. At least one of the controllable valve elements is preferably a valve, in particular a switch valve, preferably a 2/2-way valve. Alternatively, it is also possible that the controllable valve elements are designed integrally with one another as a valve, wherein a 3/2-way valve can for example be provided that comprises the two controllable valve elements and/or assumes the functionality of the controllable valve elements.

A development of the invention provides that the gas feed chamber is associated with a first controllable gas valve element that is configured to admit operating gas into the gas feed chamber. The gas feed chamber is associated with a second gas valve element that is configured to discharge operating gas from the gas feed chamber. It is possible that at least one of the gas valve elements is designed as a valve, in particular as a switch valve, in particular as a 2/2-way valve. Alternatively, it is possible that the gas valve elements are designed integrally with one another as a valve, for example as a 3/2-way valve. A preferred embodiment of the gas spring system provides that at least one of the gas valve elements is designed as a controllable valve element or controllable valve.

Particularly preferred is an exemplary embodiment of the gas spring system, in which at least one of the gas valve elements is designed as a check valve. If the first gas valve element is designed as a check valve, it is preferably pretensioned in the direction of an outside of the gas feed chamber in a closed position so that it is closed if a pressure in the gas feed chamber is higher than a pressure outside the gas feed chamber. It opens if the pressure in the gas feed chamber falls below the pressure on the outside upstream of the first gas valve element so that operating gas can then flow via the first gas valve element into the gas feed chamber. If the second gas valve element is designed as a check valve, it is preferably pretensioned in the direction of an inside of the gas feed chamber in a closed position. It is then closed if the pressure on the inside of the gas feed chamber is lower than a pressure downstream of the second gas valve element, in particular if operating gas is sucked into the gas feed chamber. If a pressure is built up in the gas feed chamber and exceeds the pressure downstream of the second gas valve element, the latter opens so that the operating gas can be transported out of the gas feed chamber. Both the first gas valve element and the second gas valve element are particularly preferably designed as check valves. The design of a gas valve element as a check valve indicates a functional and cost-effective design of the gas spring system that also saves installation space.

A development of the invention provides that the gas pressure generation unit is connected via a fluid connection to a gas pressure reservoir downstream of the gas pressure generation unit when viewed in the direction of flow of the operating gas. The gas pressure reservoir is configured to store the pressurized operating gas. The gas pressure reservoir is in particular designed as a compressed air reservoir. The gas pressure reservoir preferably can be or is connected via fluid connections to the at least one gas pressure receiver. By means of the gas pressure reservoir, a storing and buffering of the operating gas for the gas spring system is in particular possible.

The gas pressure generation unit is in particular designed integrally with the gas pressure reservoir. This constitutes a particularly installation space-saving design of the gas spring system. In this case, it is preferably provided that the second gas valve element opens directly into the gas pressure reservoir so that operating gas can be transported directly from the gas feed chamber into the gas pressure reservoir through the second gas valve element.

The task is also solved by creating a motor vehicle that comprises an energy gas reservoir that is configured to store energy gas for a motor drive of the motor vehicle. In this case, the motor vehicle comprises a gas spring system according to one of the exemplary embodiments described above. The energy gas reservoir is operatively connected to the gas pressure generation unit. The gas pressure generation unit is connected via fluid connections to at least one gas pressure receiver. In connection with the motor vehicle, in particular those advantages are realized that were already explained in connection with the gas spring system.

The term "motor drive of the motor vehicle" in particular refers to a drive that is configured to cause a movement of the motor vehicle. The energy gas thus provides energy for the movement drive of the motor vehicle, in particular its propulsion.

That the energy gas reservoir is operatively connected to the gas pressure generation unit in particular means that a fluid connection between the energy gas reservoir and the gas pressure generation unit exists such that the gas pressure generation unit can be operated, in particular driven, by means of the pressure of the energy gas. In this case, the energy gas reservoir is preferably connected via a fluid connection to the energy gas chamber, in particular via the first controllable valve element.

The fluid connection preferably comprises a pressure-reducing valve between the energy gas reservoir and the gas pressure generation unit, which pressure-reducing valve is configured to reduce the energy gas pressure, in particular to a pressure that is suitable for operating the gas pressure generation unit. Usually, an energy gas provided for a motor drive of the motor vehicle is stored under a pressure that is higher than a pressure that is suitable for operating the gas pressure generation unit. It is in particular possible that the energy gas is present in the energy gas reservoir at a pressure of 700 bar.

In the fluid connection between the gas pressure generation unit and the at least one gas pressure receiver, a gas pressure reservoir is preferably arranged, which can in particular be designed integrally with the gas pressure generation unit. The operating gas of the gas spring system can then be fed to the gas pressure receiver from the gas pressure generation unit via the gas pressure reservoir.

The at least one gas pressure receiver can be part of the motor vehicle and/or part of the gas spring system. It is in particular preferred that the gas pressure receiver is designed as a spring leg. Preferably, the motor vehicle comprises a plurality of gas pressure receivers, which are preferably designed as spring legs and connected via fluid connections to the gas pressure generation unit.

A development of the invention provides that the motor vehicle comprises a fuel-cell drive. The term "fuel-cell drive" refers to a motor drive that is associated with a fuel cell for providing electrical power, wherein the actual motor drive is designed as an electric drive. A fuel cell is in particular a unit, in which an energy gas, in particular a burnable gas, in particular a combustion gas, can be oxidized preferably by supplying oxygen, wherein the reduction of the oxygen on the one hand and the oxidation of the energy gas on the other hand take place in different half-cells, wherein an electric voltage can be tapped from the half-cells. In this way, the fuel cell is configured to provide electrical power.

A preferred embodiment of the fuel-cell drive provides that hydrogen is used as energy gas. Accordingly, the energy gas reservoir is preferably configured to store hydrogen as energy gas for the fuel-cell drive.

A preferred embodiment of the motor vehicle provides that the gas pressure generation unit is connected via a fluid connection to the fuel-cell drive downstream of the gas pressure generation unit when viewed in the flow direction of the energy gas, wherein in particular the energy gas chamber is connected via a fluid connection to the fuel-cell drive via the second controllable valve element. Thus, the energy gas used to operate the gas pressure generation unit can be fed back to the fuel-cell drive after it is used in the gas pressure generation unit and can be used for the motor drive of the motor vehicle there. The typically expensive combustion gas is thus not lost but virtually supplied for double use. The fact that the pressure of the energy gas drops again in the gas pressure generation unit does not oppose this double use since the pressure level for operating the fuel cell is usually lower than the pressure level that is suitable for operating the gas pressure generation unit. Furthermore, it is easily possible that the fuel-cell drive comprises a conveyor unit for transporting the energy gas, which conveyor unit is provided downstream of an entry of the fluid connection from the gas pressure generation unit into the fuel-cell drive.

The task is finally also solved by creating a method for operating a motor vehicle with an energy gas drive, wherein a gas spring system of the motor vehicle comprises a gas pressure generation unit that is operated, in particular driven, with an energy gas pressure of an energy gas for the energy gas drive. In connection with the method, in particular those advantages are realized that were already explained in connection with the gas spring system and the motor vehicle.

A motor vehicle according to one of the exemplary embodiments described above is particularly preferably operated within the scope of the method.

A preferred embodiment of the method provides that a motor vehicle is operated with a gas spring system according to one of the exemplary embodiments described above.

A development of the invention provides that a fuel cell vehicle is operated as a motor vehicle.

The description of the gas spring system and the motor vehicle on the one hand and of the method on the other hand are to be understood to be complementary to each other. Features of the gas spring system and/or the motor vehicle that were explained explicitly or implicitly in connection with the method are preferably individually or in combination with one another features of a preferred exemplary embodiment of the gas spring system and/or the motor vehicle. Method steps that were described explicitly or implicitly in connection with the gas spring system or the motor vehicle are preferably individually or in combination with one another steps of a preferred embodiment of the method. The method is preferably characterized by at least one method step that is due to at least one feature of an exemplary embodiment that is either according to the invention or preferred, of the gas spring system and/or the motor vehicle. The gas spring system and/or the motor vehicle is/are preferably characterized by at least one feature that is due to at least one method step of an embodiment that is either according to the invention or preferred, of the method.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
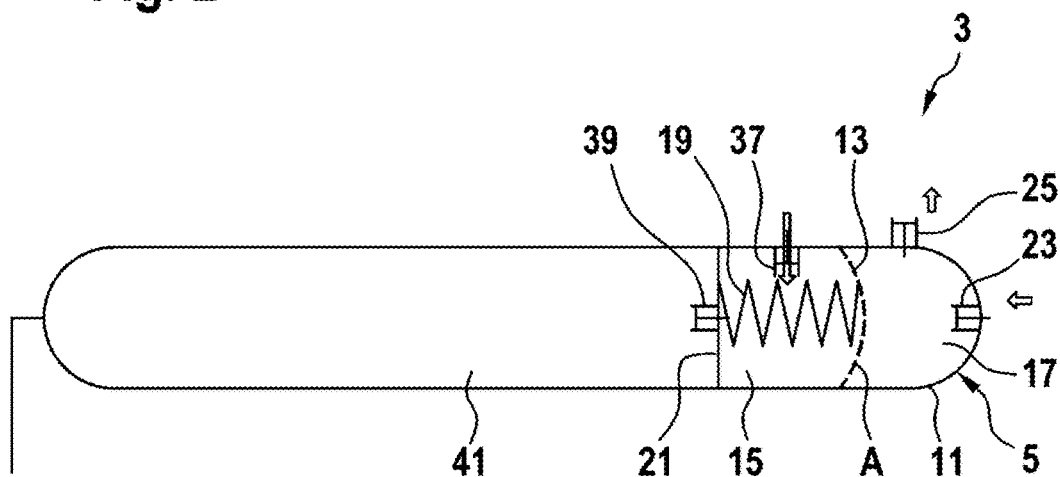
Figure 3:
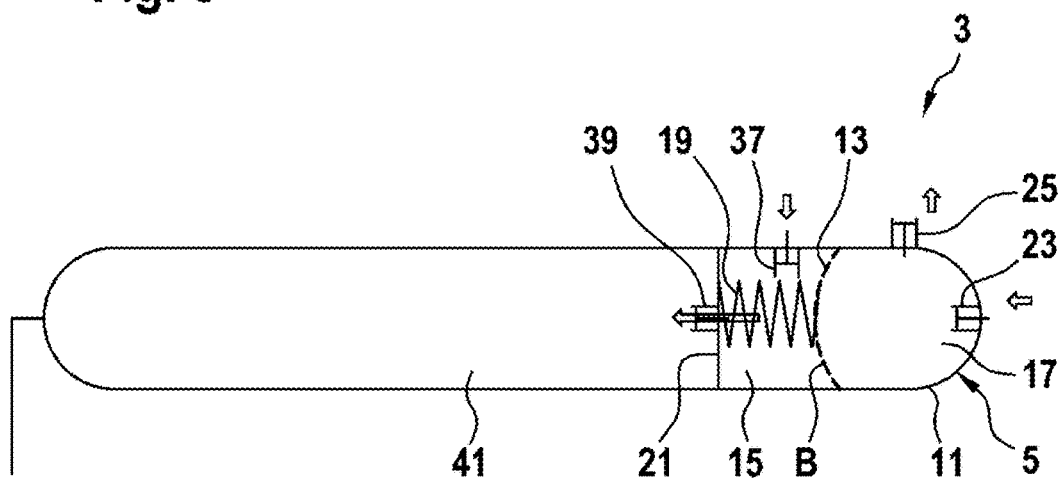

The invention is explained in further detail below based on the drawing. The following is shown:

FIG. 1 a schematic representation of an exemplary embodiment of a motor vehicle with a gas spring system;

FIG. 2 a schematic representation of a first operating state of the gas spring system, and FIG. 3 a schematic representation of a second operating state of the gas spring system.

DETAILED DESCRIPTION

FIG. 1 shows a schematic representation of an exemplary embodiment of a motor vehicle 1 with an exemplary embodiment of a gas spring system 3. The gas spring system 3 comprises a gas pressure generation unit 5 that is connected via a fluid connection to a gas pressure receiver 7 indicated only schematically here. The gas pressure generation unit 5 is designed to be operated by gas pressure. It is furthermore configured to pressurize an operating gas for operating the gas spring system 3 and to supply it to the gas pressure receiver 7.

The motor vehicle 1 comprises a motor drive (not shown), wherein the motor drive is supplied with energy that came from an energy gas. Preferably, the motor vehicle 1 is designed as an electric vehicle with a fuel-cell drive, wherein the fuel cell of the fuel-cell drive can be supplied with chemical energy in the form of an energy gas. For storing the energy gas, the motor vehicle comprises an energy gas reservoir 9. The energy gas reservoir 9 is preferably configured to store hydrogen as energy gas for the fuel-cell drive. The hydrogen is preferably stored at a pressure of 700 bar in the energy gas reservoir 9, which is preferably designed as a pressure tank and/or cryogenic tank.

The gas pressure generation unit 5 is configured to be operated, in particular driven, by the energy gas pressure of the energy gas.

In the exemplary embodiment shown here, the gas pressure generation unit 5 is in particular designed as a diaphragm pump 11. It comprises a diaphragm 13 that separates a gas feed chamber 15 in the gas pressure generation unit 5 from an energy gas chamber 17 that is also formed in the gas pressure generation unit 5.

The diaphragm 13 can in particular be deflected into two shape states, which both are indicated schematically in FIG. 1. At A, a first shape state of the diaphragm 13 is shown, in which it is deflected in the direction of the energy gas chamber 17, in particular from an imagined center position between the two shape states. At B, the diaphragm 13 is shown in a second shape state, in which it is deflected in the direction of the gas feed chamber 15 from the imagined center position. By changing the state of the diaphragm 13 from the first shape state to the second shape state and back, the volume of the gas feed chamber 15 can be changed, in particular periodically, wherein the volume of the gas feed chamber 15 is smaller when the diaphragm is arranged in the second shape state B and larger when the diaphragm 13 is arranged in the first shape state A.

The diaphragm 13 is pretensioned in the direction of the energy gas chamber 17, thus in the first shape state A, in this case in particular by means of a spring element 19 that is in particular designed as a coil spring that is supported on the one hand by a wall 21 of the gas pressure generation unit 5 and on the other hand by the diaphragm 13.

The energy gas chamber 17 is associated with a first controllable valve element 23 that is used to admit energy gas into the energy gas chamber 17. Furthermore, it is associated with a second controllable valve element 25 that is used to discharge energy gas from the energy gas chamber 17. The controllable valve elements 23, 25 are preferably designed as switch valves, in particular as 2/2-way valves.

The first controllable valve element 23 is connected via a fluid connection to the energy gas reservoir 9, in this case in particular via a first pressure-reducing valve 27. The second controllable valve element 25 is connected via a fluid connection to the fuel-cell drive. The fuel-cell drive in this case is connected via a fluid connection via a second pressure-reducing valve 29 to the energy gas reservoir 9, wherein the second pressure-reducing valve 29 is in particular arranged fluidically in parallel to the first pressure-reducing valve 27 and/or downstream of a branch point, which leads to the first pressure-reducing valve 27, from a flow path for the energy gas to the fuel-cell drive, wherein—when viewed in the direction of flow of the energy gas—a manifold 31 is arranged downstream of the second pressure-reducing valve 29, said manifold being fed on the one hand from the second pressure-reducing valve 29 and on the other hand from the second controllable valve element 25. The second controllable valve element 25 is thus in particular connected via a fluid connection to the manifold 31. Downstream of the manifold 31, a conveyor unit 33 is arranged, which is preferably designed as a jet pump. Downstream of the conveyor unit 33, a fuel cell 35 is once again arranged, which is supplied with the energy gas for generating electrical power. The energy gas used to drive the gas pressure generation unit 5 is thus recovered for use in the fuel cell 35 and in this respect supplied for double use.

The gas feed chamber 15 is associated with a first gas valve element 37 for admitting an operating gas into the gas feed chamber 15. The gas feed chamber 15 is also associated with a second gas valve element 39 for discharging the operating gas from the gas feed chamber 15. The gas valve elements 37, 39 are preferably designed as check valves. The first gas valve element 37 is preferably directly connected via a fluid connection to the surroundings of the gas spring system 3 for sucking in surrounding air as operating gas.

Downstream of the gas pressure generation unit 5, the gas pressure generation unit 5 is connected via a fluid connection to a gas pressure reservoir 41, wherein the gas pressure generation unit 5 is in this case designed integrally with the gas pressure reservoir 41. In particular, the second gas valve element 39 opens directly into the gas pressure reservoir 41. In this case, the gas pressure generation unit 5 and the gas pressure reservoir 41 are preferably arranged in the same housing, in particular in the same pressure reservoir, wherein they are separated from one another only by the wall 21 and the second gas valve element 39 preferably arranged therein.

The functionality of the gas spring system 3 is explained below in connection with FIGS. 2 and 3.

FIG. 2 shows a schematic representation of a first functional state of the gas spring system 3. The same elements and elements with the same function are provided with the same reference symbols so that reference is made in this respect to the description above. FIG. 2 shows in particular the suction process for sucking operating gas into the gas pressure generation unit 5. For the suction process, the second controllable valve element 25 is opened, wherein the first controllable valve element 23 is closed at the same time. Pressurized energy gas can thereby escape from the energy gas chamber 17 so that the pressure in the energy gas chamber 17 drops. The diaphragm 13 is then pushed into the first shape state A due to the pretensioning, in this case by the spring element 19. In the process, the volume of the gas feed chamber 15 is increased, whereby the pressure in the gas feed chamber 15 drops. The first gas valve element 37, which is designed as a check valve, opens and fresh air is sucked into the gas feed chamber 15 through the first gas valve element 37. At the same time, the second gas valve element 39 is closed since the pressure in the gas pressure reservoir 41 is higher than in the gas feed chamber 15.

FIG. 3 schematically shows a second functional state of the gas spring system 3. In particular, a pumping process of the gas pressure generation unit 5 is explained here. The same elements and elements with the same function are provided with the same reference symbols so that reference is made in this respect to the description above.

For the pumping process, the first controllable valve element 23 is opened, whereas the second controllable valve element 25 is closed. As a result, pressurized energy gas flows through the first controllable valve element 23 into the energy gas chamber 17 and there builds up a pressure that deflects the diaphragm 13 against its pretensioning into the second shape state B. The volume in the gas feed chamber 15 is thereby reduced and the pressure there increases. As a result, the first gas valve element 37 closes, whereas the second gas valve element 39 opens so that compressed air as operating gas can flow into the gas pressure reservoir 41 through the second valve element 39.

This sequence of functional states is repeated, preferably periodically, as needed in particular based on the required pressure in the gas pressure reservoir 41, whereby a pressure is built up in the gas pressure reservoir 41 and in particular can also be maintained. The gas pressure receiver 7 can then be supplied with the gas pressure from the gas pressure reservoir 41.

It is shown overall that in the gas spring system 3, in the motor vehicle 1, and in particular in the execution of the method, an air spring compressor can be dispensed with so that acoustic disadvantages are prevented, wherein at the same time installation space is saved and a cost-effective solution is provided.

What is claimed is:
1. A gas spring system for a motor vehicle, comprising:
   a gas pressure generation unit having a gas feed chamber, an energy gas chamber, and a diaphragm that separates the gas feed chamber from the energy gas chamber, the gas pressure generation unit being operated by a gas pressure, the gas pressure being an energy gas pressure of an energy gas for a motor vehicle drive;

at least one gas pressure receiver in fluid connection with the gas pressure generation unit;

a first controllable valve element configured to admit a second gas into a first chamber; and a second controllable valve element configured to discharge the second gas from the first chamber.

2. The gas spring system of claim 1, wherein the gas pressure generation unit is a diaphragm pump.

3. The gas spring system of claim 1, wherein the diaphragm comprises a first state and a second state, wherein the diaphragm in the first state is deflected in a direction of the energy gas chamber, and the diaphragm in the second state is deflected in a direction of the gas feed chamber.

4. The gas spring system of claim 1, wherein the diaphragm is pretensioned in a direction of the energy gas chamber.

5. The gas spring system of claim 1, wherein the energy gas chamber comprises the first and second controllable valve elements, wherein the first chamber is the energy gas chamber, and wherein the second gas is the energy gas.

6. The gas spring system of claim 1, wherein the gas feed chamber comprises the first and second controllable valve elements, wherein the first chamber is the gas feed chamber, and wherein the second gas is an operating gas.

7. The gas spring system of claim 1, wherein the gas pressure generation unit is in fluid connection with a gas pressure reservoir.

8. The gas spring system of claim 7, wherein the gas pressure generation unit is integrally connected to the gas pressure reservoir.

9. A motor vehicle, comprising:
an energy gas reservoir for storing energy gas for a motor drive of the motor vehicle; and
a gas spring system comprising:
a gas pressure generation unit configured to operate by an energy gas pressure of the energy gas for the motor drive of the motor vehicle, the gas pressure generation unit having a first chamber, a second chamber, and a diaphragm that separates the first chamber from the second chamber;
at least one gas pressure receiver in fluid connection with the gas pressure generation unit;
a first controllable valve element configured to admit a second gas into the first chamber; and
a second controllable valve element configured to discharge the second gas from the first chamber,
wherein the energy gas reservoir is operatively connected to the gas pressure generation unit.

10. The motor vehicle of claim 9, wherein the motor vehicle comprises a fuel-cell drive.

11. The motor vehicle of claim 10, wherein the energy gas reservoir is configured to store hydrogen as energy gas for the fuel-cell drive.

12. The motor vehicle of claim 9, wherein the first chamber is an energy gas chamber that comprises the first and second controllable valve elements, and wherein the second gas is the energy gas.

13. The motor vehicle of claim 9, wherein the first chamber is a gas feed chamber that comprises the first and second controllable valve elements, and wherein the second gas is an operating gas.

14. A method for operating a motor vehicle having an energy gas drive, the method comprising:
pretensioning a diaphragm into a first state using a spring element, wherein the spring element is located within a gas feed chamber between the diaphragm and a separating wall that separates the gas feed chamber from an energy gas chamber;
admitting an operating gas into the gas feed chamber;
pressurizing the energy gas chamber using an energy gas from the energy gas drive of the motor vehicle,
wherein pressurizing the energy gas chamber causes the diaphragm to transition to a second state, and
wherein pressurizing the energy gas chamber causes the operating gas in the gas feed chamber to become pressurized; and
supplying the pressurized operating gas to a gas pressure receiver.

15. The method of claim 14, wherein the motor vehicle is a fuel cell vehicle.

16. The method of claim 14, further comprising: admitting energy gas into the energy gas chamber via a first controllable valve element; and discharging the energy gas from the energy gas chamber via a second controllable valve element.

17. The method of claim 14, further comprising: admitting an operating gas into the gas feed chamber via a first gas valve element; and discharging the operating gas from the gas feed chamber via a second gas valve element.

* * * * *